July 16, 1957   H. E. WALKER   2,799,043
FISH CUTTING MACHINE
Filed Feb. 16, 1955   2 Sheets-Sheet 1

Inventor
Harry E. Walker
by Wright, Brown,
Quinby & May
Attys.

July 16, 1957 H. E. WALKER 2,799,043
FISH CUTTING MACHINE
Filed Feb. 16, 1955 2 Sheets-Sheet 2
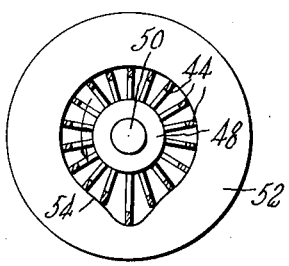
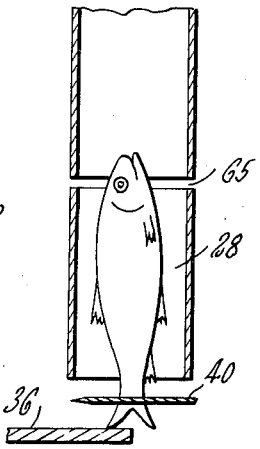
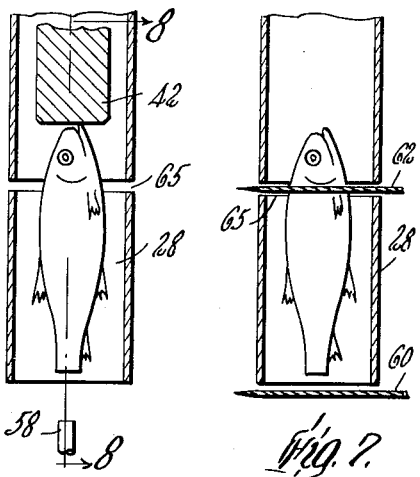
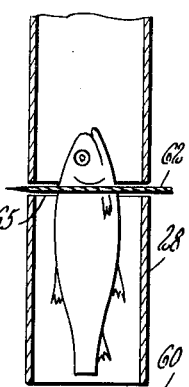
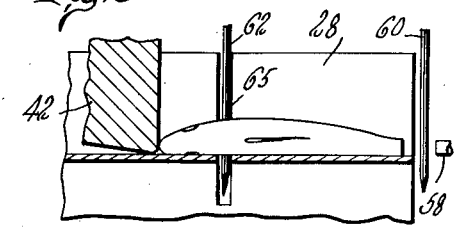
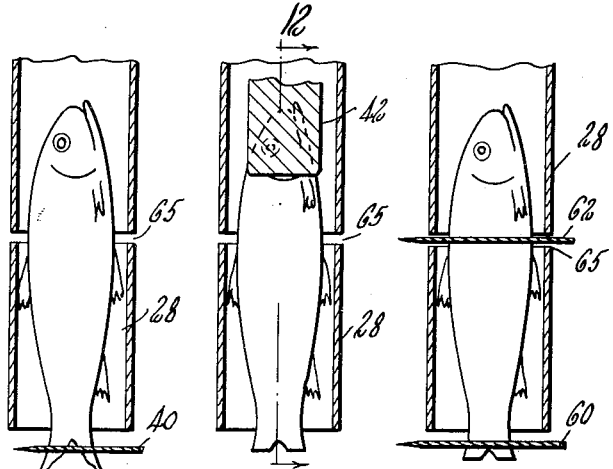
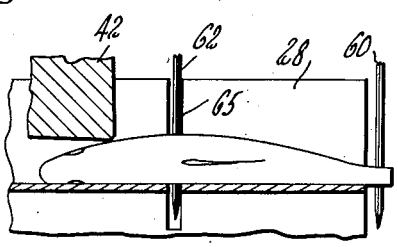
Inventor
Harry E. Walker United States Patent Office 2,799,043
Patented July 16, 1957

2,799,043

FISH CUTTING MACHINE

Harry E. Walker, Bath, Maine, assignor, by mesne assignments, to J. Burleigh Crane, Milbridge, and Harry E. Walker, Bath, Maine, trustees Application February 16, 1955, Serial No. 488,474

4 Claims. (Cl. 17—4)

This invention relates to machinery for cutting small fish preparatory to packing them in cans. A machine for this purpose is described in my copending application Serial No. 419,179, filed March 24, 1954. The present invention relates to improvements over that machine. The herring which are seined off the coast of Maine vary considerably in size. It is an object of the present invention to provide a machine which will cut off the tails of fish varying, say, from three to nine inches in length, these being the practical size limits of fish to be packed in four-inch cans as "sardines," and will also cut off the heads of the smaller sizes and a sufficient length of the larger sizes to leave a four-inch section of the latter, measuring from the stump of the tail, the tail portion of a fish being the choicer portion of the body. To accomplish this result with fish of different sizes, the individual fish are advanced sidewise after being oriented so as to point in a predetermined direction. Each fish is then moved tail-first against a gauge which is offset about half an inch from a circular knife so that as the fish is moved past the knife it makes a cut half an inch or so from the extremity of the tail. This removes substantially all of the tail of a small fish, but only part of the tail of a larger fish. For convenience in advancing the fish sidewise, they are carried one by one in a succession of parallel troughs, the gauge which is engaged by the fish tails being near the front end of the troughs. After each trough passes the tail-cutting knife, it approaches two circular knives which are mounted on a common shaft and are spaced apart four inches if the fish are to be packed in standard sardine cans, or further apart if the fish are to be packed in larger cans. The planes of these knives are parallel to the plane of the tail-cutting knife and are offset toward the rear of the machine so that the larger fish have the rest of the tail cut off and enough of the head end to leave a four-inch section of the body. As each fish approaches the two knives, a clamping finger descends into the trough to hold it in place during the cutting operation. The forward end of the finger is offset about an inch beyond the rearmost of the circular knives so that if the fish in a trough measures less than five inches from its nose to the stump of its tail, a finger descends into the trough beyond the fish and does not clamp it. After a finger has entered a trough, a jet of water is squirted into the trough from the front end thereof. If the trough is occupied by a fish which is too small to be clamped by the finger in the trough, the jet moves the fish rearward in the trough until its nose brings up against the forward end of the finger which thus acts as a stop or gauge instead of a clamp so that the smaller fish are properly located to be decapitated by the rear knife.

An embodiment of the invention is illustrated on the drawings, of which:

Figure 4 is a section on the line 4—4 of Figure 3;

Figure 5 is a fragmentary diagrammatic plan view on a larger scale, of a trough with a small fish therein, a rotary knife and a fixed stop in front of the trough;

Figure 6 is a similar view of the trough containing the fish when it has reached a jet and a pressing finger;

Figure 7 is a similar view of the trough with a fish when it has reached a pair of knives;

Figure 8 is a section on the line 8—8 of Figure 7;

Figure 1:
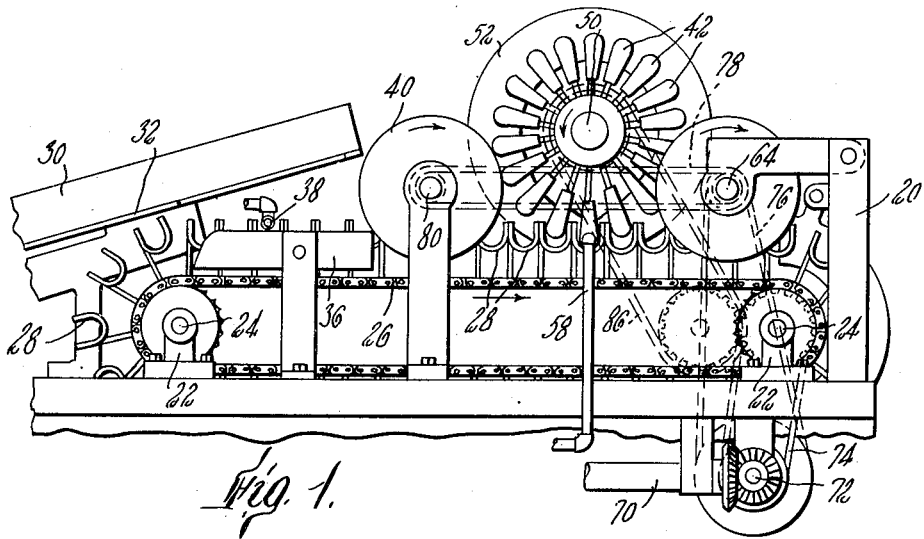
Figure 1 is a front elevation of apparatus embodying the invention.

Figures 9, 10, and 11 are fragmentary plan views of a trough in successive positions of operation with a fish of larger size; and Figure 12 is a section on the line 12—12 of Figure 10.

The fish cutting machine illustrated on the drawings includes a main frame 20 carrying bearing members 22 in which are journalled shafts 24 for an endless conveyor 26 which includes a series of troughs 28 extending transversely with respect to their direction of motion. The troughs in the horizontal stretch of the conveyor are in side to side contact and progress sidewise as the conveyor moves. Fish are deposited one by one in successive troughs, the machine being designed to cut off the tails of all such fish and to cut off the heads together with enough of the body portion adjoining the head to leave a piece for packing, the length of which is not over the length of the can in which it is to be packed, e. g., four inches. In the case of fish smaller than five inches in length, the residual portion after the head and tail have been cut off is less than four inches in length.

Figure 2:
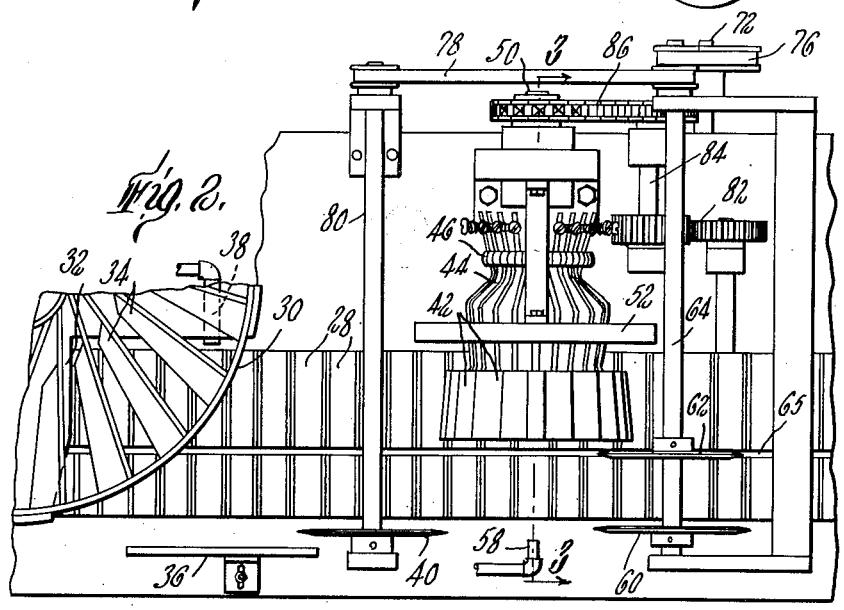
Figure 2 is a fragmentary plan view of the same.

Fish are deposited in the troughs at the left-hand end of the upper horizontal stretch of the conveyor as shown in Figure 1, each fish heading away from the front of the machine. The fish may be so deposited by any convenient means such as a wheel 30 which turns on an inclined table 32. The wheel has a series of vanes 34 which form radial compartments into which individual fish can be deposited heading radially inward. As the wheel 30 rotates in timed relation to the movement of the conveyor, the fish which are in the compartments of the wheel drop into troughs as the compartments reach a cut-out sector of the table 32 (Figure 2). Each trough advances toward the right from the loading station at the edge of the cut-out gap in the table 32 and passes a gauge plate 36 mounted on the frame 20 adjacent to the front end of passing troughs. Opposite to the gauge plate 36 is a nozzle 38 mounted to direct a jet of fluid such as water into the rear end of each passing trough to wash the fish therein forward until its tail bears against the gauge plate 36. The conveyor then takes the fish to a rotating circular knife 40 the plane of which is offset to the rear of the plane of the gauge 36, and a corresponding amount is cut from the tail of the fish. In the case of the small fish, substantially the entire tail is cut off, as indicated in Figure 5. In the case of larger fish having longer tails, only part of the tail is cut off by the knife 40.

After passing the knife 40, the trough comes to a set of presser elements 42. These elements are for convenience arranged in a circular series, each being part of a rocking lever 44 which is pivotally mounted on ears 46 projecting from a collar 48 fixed on a horizontal shaft 50. The shaft 50 is rotated in timed relation to the motion of the troughs so that successive elements or fingers 42 enter successive troughs 28. To avoid clashing of the fingers 42 on the walls of the troughs, the fingers which would otherwise describe a circular path around the axis of the shaft 50 move in a modified path controlled by a cam member 52, the inner edge 54 of which guides the levers 44 (Figure 4). Each lever is pressed by a spring 56 tending to swing its finger 42 radially outward, but the spring is opposed by the cam edge 54 which permits such outward swing only as the finger starts to enter the trough thereunder. The cam edge 54 then permits the finger to descend rapidly to the bottom of the trough unless it encounters a fish therein, in which case it clamps the fish in place during a brief period when a jet of fluid such as water is projected from a nozzle 58 into the front end of the trough passing under the axis of the shaft 50. The finger is then lifted from the trough as the latter moves on to two circular rotating knives 60 and 62 which are mounted on a common shaft 64 in planes parallel to the plane of the knife 40. The knives 60 and 62 are spaced apart a distance equal to the length of the can in which the fish are to be packed, e. g., four inches, and the walls of the troughs are slotted as at 65 to accommodate the knife 62. The ends of the presser fingers 42 are offset to the rear of the plane of the knife 62 by about one inch.

Figure 3:
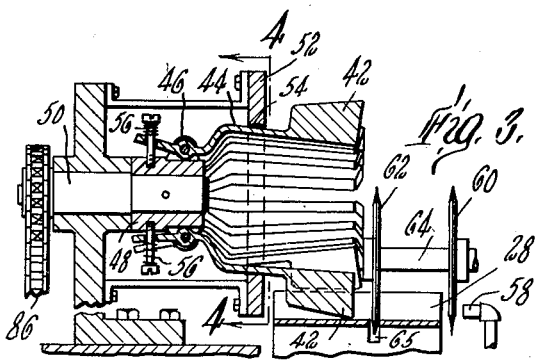
Figure 3 is a section on the line 3—3 of Figure 2.

The operation of the mechanism is as follows. Single fish of any size within the range which can be accommodated by the apparatus are deposited, tail toward the front, in successive troughs 28 by the wheels 30 or otherwise. The water jet from the nozzle 38 washes each fish forward until its tail touches the gauge 36. Thereupon the knife 40 cuts off half an inch or so of the tail. The trough moves onto the presser device and one of the presser fingers 42 enters it from above. If the head end of the fish in the trough extends rearwardly beyond the forward end of the presser finger, the latter is resiliently pressed down on the head of the fish (Figures 10 and 12), clamping the fish in place so that it is not shifted by the water jet which is projected rearward in the trough by the nozzle 58. The knives 60 and 62 then cut off the remainder of the tail of the fish and enough of the head portion to leave a four-inch body piece to be packed. If, however, the fish in a trough 28 is not long enough to reach the finger 42 which enters the trough, the finger moves to the bottom of the trough (Figure 3) and acts as a gauge or stop against which the fish is washed by the jet stream from the nozzle 58 (Figures 6 and 8). The fish is then in position to be decapitated by the knife 62, the rearward offset of the finger from the plane of the knife 62 being adjusted to the proper distance for that purpose. The presser fingers 42 thus act as a clamp for the large fish and as a gauge or stop for the small fish, the result being that a four-inch piece is cut from each large fish extending from the stump of the tail toward the head end, and the tails and heads, but no more, are cut from the small fish. After being cut by the knives 60 and 62 the pieces of the fish are discharged into suitable receptacles (not shown) at the right hand end of the machine.

Any suitable driving means may be employed for driving the conveyor and the presser fingers in timed relation so that each finger will enter or leave a trough without striking against the walls of the trough. As shown, a power shaft 70 is connected to a transverse shaft 72 which is connected by a chain 74 to a sprocket wheel on the shaft 24 for driving the conveyor 28. The shaft 72 is also connected by chains or belts 76 and 78 to the shaft 64 on which the knives 60 and 62 are mounted and a shaft 80 on which the knife 40 is mounted. The shaft 72 is connected by gearing 82, a countershaft 84 and a chain 86 to the shaft 50 which carries the presser fingers.

I claim:

1. Apparatus of the class described comprising a frame, an endless conveyor mounted on said frame, said conveyor including a series of troughs arranged side to side, means for driving said conveyor to move said troughs sidewise to pass a loading station and two successive cutting stations, means on said frame at the loading station for loading individual fish into successive troughs as they pass the loading station, a fixed gauge on said frame adjacent to the front end of the troughs leaving the loading station, means mounted opposite to said gauge for moving each fish into contact with said gauge in passing, a rotary knife on said frame adjacent to said gauge and engageable by each fish which has been positioned by said gauge, said knife being arranged in a plane parallel to that of the gauge and offset to the rear thereof, a series of presser fingers carried by said frame above said troughs, means carried by said frame for moving a finger down into each trough after the trough has passed said knife and for lifting the finger from the trough after a brief interval, jet-directing means mounted in front of said conveyor at a point where said movable fingers reach the bottom of passing troughs to direct a jet of fluid into each trough from the front end thereof when a finger is therein, and two coaxial parallel rotary knives carried by said frame and engageable by successive fish in the troughs after they have passed said presser fingers.

2. In a fish cutting machine having a frame, an endless conveyor carried by said frame including a series of troughs arranged side by side for sidewise movement, and rotary knives mounted on said frame and arranged to be engaged by fish carried in said troughs, a series of presser elements mounted above said conveyor and movable into and out of successive troughs approaching said knives, means on said frame for pressing successive presser elements into successive troughs and moving said elements out of the troughs after a brief interval, and means mounted in front of said conveyor for directing a jet of fluid into the trough occupied by one of said elements in a direction to tend to move a fish in said trough to the element therein.

3. In a fish cutting machine having a frame, an endless conveyor carried by said frame including a series of troughs arranged side by side for sidewise movement, means for driving said conveyor, a fixed gauge supported by said frame adjacent to the front end of some of said troughs, means mounted adjacent to said gauge for directing a jet towards said gauge in the troughs passing the gauge, presser elements supported above said conveyor, means carried by said frame for yieldingly moving a presser element into each trough after it has passed said jet directing means and for moving the presser element out of the trough after a brief interval, and a rotatable disc knife mounted on said frame above said conveyor at a point spaced from said presser elements and arranged to intersect each trough after it has moved clear of said presser elements.

4. In a fish cutting machine which includes a frame, an endless conveyor on said frame carrying a series of troughs arranged side by side for sidewise motion, means for driving said conveyor and means for cutting fish contained in said troughs; a shaft carried by said frame, means for rotating said shaft in timed relation to the movement of the conveyor, a collar secured to said shaft with radially projecting ears, a series of levers rockably mounted on said ears and projecting out over said conveyor, each said lever having a presser element at one end thereof adapted to swing radially outward to enter one of said troughs, spring means on said levers tending to swing all said presser elements radially outward, and cam means holding each presser element radially inward as it approaches a trough and guiding it into and out of the trough as it passes.

References Cited in the file of this patent

UNITED STATES PATENTS

| | | |
|---|---|---|
| 1,394,185 | Rogers | Oct. 18, 1921 |
| 1,565,648 | Hoyt | Dec. 15, 1925 |
| 1,628,765 | Bergen | May 17, 1927 |
| 2,245,329 | Danielsson | June 10, 1941 |
| 2,535,349 | Christiansen | Dec. 26, 1950 |